United States Patent Office 3,037,040
Patented May 29, 1962

3,037,040
HYDROCARBYLTIN SALTS OF SUBSTITUTED SUCCINIC ACIDS
Kenneth H. Anderson, South Charleston, and Robert G. Kelso, St. Albans, W. Va., assignors to Union Carbide Corporation, a corporation of New York
No Drawing. Filed May 21, 1958, Ser. No. 736,679
11 Claims. (Cl. 260—429.7)

The present invention relates to stabilized vinyl halide resin compositions and to processes for their production. More particularly, the invention is directed to new and improved stabilizing materials which show definite advantage in increasing the resistance of vinyl halide resins to discoloration.

As employed herein, the term "vinyl halide resin" is meant to include those resins prepared by the polymerization of a vinyl halide either alone, or in conjunction with other unsaturated polymerizable compounds, such as vinylidene chloride, acrylonitrile, styrene, vinyl esters of aliphatic acids, as for instance vinyl acetate, alkyl esters of mono-olefinic acids, as for instance, dialkyl fumarate or maleate, and the like; and also vinylidene chloride polymer. The vinyl halide concerned with here is ordinarily and preferably the chloride, although the other halides, such as the bromide and fluoride, are also contemplated. The invention is of particular merit when applied to vinyl halide resins prepared by the polymerization of vinyl chloride either alone, or in conjunction with acrylonitrile, vinylidene chloride or both, or with vinyl acetate, and especially to those resins containing at least about 15 percent by weight of the halogen-containing monomer.

Vinyl halide resins, in general, are well known to the art, and their valuable properties as components of thermoplastic compositions of various types have ben recognized. It is also known that vinyl halide resins are sensitive to both heat and light as manifested by discoloration. By way of illustration, in the compounding and processing of these resins into molded and extruded articles such as synthetic fibers and films, or as constituents of coating compositions, it is usually necessary to subject the resins to elevated temperatures. Under such conditions, a tendency in the resins toward progressive yellowing or darkening is commonly encountered. Moreover, a continued gradual development of color in the resins can generally be observed upon exposure to light or to such elevated temperatures as may be experienced in normal usage.

While the initial stages of color development reached during formation or subsequent treatment of the resins may not materially detract from some of their qualities, many uses of the resins are thereby restricted. Consequently, continued color development in the resins becomes increasingly undesirable. It is therefore expedient to incorporate in vinyl halide resins small amounts of stabilizing materials for the purpose of retarding or inhibiting discoloration.

Heretofore, a considerable number of compounds designed to function as stabilizers for this purpose have been suggested. Prominent among these are organo-metallic compounds, particularly those containing tin or lead, such as dioctyl tin maleate and lead stearate. Unfortunately, however, many of these organo-metallic compounds have not been found entirely successful in minimizing the discoloration of vinyl halide resins upon prolonged exposure to the action of either elevated temperature or light. Other, efficient stabilizers contribute undesirable side effects which prevent their satisfactory utilization. For example, certain of the organo-metallic compounds, especially those of lower molecular weight, have been found to engender an unpleasant odor in articles produced from the stabilized resins. Still other organo-metallic compounds have been found to be relatively insoluble in the spinning solutions commonly employed in the production of synthetic fibers from vinyl halide resins and are therefore unsuitable for use in minimizing the discoloration of the synthetic fibers.

The problems inherent in stabilizing vinyl halide resins generally vary depending upon several factors, such as the chemical composition of the resins and the form in which the resins are employed or which is given to the resins during processing. Consequently, a specific stabilizer that is suitable for use with one type of vinyl halide resin may not be satisfactory for the stabilization of a vinyl halide resin having a different chemical composition. Moreover, a compound that is effective in stabilizing synthetic fibers prepared from a broad range of vinyl halide resins may not be suitable for the stabilization of films prepared from the same resins.

Accordingly, one or more of the following objects can now be achieved through the practice of the present invention, thus overcoming certain disadvantages of the prior art.

It is an object of this invention to provide vinyl halide resin compositions which show improved resistance to discoloration upon exposure to heat or light. It is another object of the invention to provide novel and improved stabilizing materials which increase the resistance of vinyl halide resins to discoloration upon exposure to heat or light. A further object of the invention is to provide a novel process for retarding or inhibiting the discoloration of vinyl halide resins upon exposure to heat or light. Still other objects will become apparent in light of the following description.

The invention is based upon the discovery that certain organic tin succinates, viz. hydrocarbyltin salts of aliphatic-substituted succinic acids, will function as excellent stabilizers for vinyl halide resins. More particularly, the compounds found to be effective as stabilizers for purposes of the invention are the dihydrocarbyltin aliphatic-substituted succinates (I) and bis(trihydrocarbyltin) aliphatic-substituted succinates (II) represented by the general formulas:

(I) 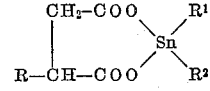

and (II) 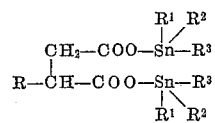

wherein R represents a saturated or unsaturated aliphatic or saturated or unsaturated cycloaliphatic radical containing from about 3 to about 18 carbon atoms, and preferably from about 3 to about 12 carbon atoms, for instance: a linear or branch-chained alkyl radical, such as a propyl, n-butyl, isobutyl, sec-butyl, n-pentyl, isopentyl, n-hexyl, 2-ethylbutyl, 2-methylpentyl, heptyl, n-octyl, 2-ethylhexyl, nonyl, decyl, undecyl, n-dodecyl, octadecyl radical, and isomeric mixture of 8-, 9- or 12-carbon alkyl radicals obtained, for example, by way of the acid-catalyzed polymerization of propylene and isobutene, and the like; an unsubstituted or lower alkyl-substituted cycloalkyl radical preferably containing from about 5 to about 6 carbon atoms in the ring, such as a cyclobutyl, cyclopentyl, cyclohexyl, 2-, 3- or 4-methylcyclohexyl, 2-ethylcyclohexyl radical, and the like; a linear or branch-chained alkenyl radical, such as a propenyl, n-butenyl, isobutenyl, sec-butenyl, n-pentenyl, isopentenyl, n-hexenyl, 2-ethylbutenyl, 2-methylpentenyl, heptenyl, n-octenyl, 2-ethylhexenyl, nonenyl, decenyl, undecenyl, n-dodecenyl, octadecenyl radical, an isomeric mixture of 8-, 9- or 12-carbon alkenyl radicals obtained, for example, by way of the acid-catalyzed polymerization of propylene and isobutene, and the like; an unsubstituted or lower alkyl-substituted cycloalkenyl radical preferably containing from about 5 to about 6 carbon atoms in the ring, such as a cyclobutenyl, cyclopentenyl, cyclohexenyl, 2-, 3- or 4-methylcyclohexenyl, 2-ethylcyclohexenyl radical, and the like, etc.; and $R^1$, $R^2$ and $R^3$ each represent a hydrocarbyl radical, i.e., a radical consisting only of carbon and hydrogen atoms, containing from about 3 to about 14 carbon atoms and preferably from about 4 to about 10 carbon atoms, for instance: a linear or branch-chained alkyl radical such as a propyl, butyl, isobutyl, sec-butyl, pentyl, isopentyl, n-hexyl, 2-ethylbutyl, 2-methylpentyl, heptyl, n-octyl, 2,2,4-trimethylpentyl, 2-ethylhexyl, nonyl, decyl, undecyl, dodecyl, tetradecyl radical, an isomeric mixture of 8-, 9- or 12-carbon alkyl radicals obtained, for example, by way of the acid-catalyzed polymerization of propylene, isobutene, and the like; an aryl radical, such as a phenyl, ortho-, meta-, or para-tolyl, 2-ethylphenyl radical, and the like; an aralkyl radical, such as a phenylmethyl, 2-phenylethyl, 2-phenylpropyl, 2-phenylbutyl, 2-phenylhexyl, 2-phenyloctyl radical, and the like, etc.

The incorporation of these organic tin succinates in vinyl halide resin compositions as herein described appreciably improves the heat and light stability of the resins to a considerable extent over commonly used and commercially available stabilizers. Moreover, the organic tin succinates of the invention are compatible with vinyl halide resins and are generally soluble in many inert organic solvents for the resins, such as those conventionally employed in the preparation of fiber spinning solutions containing the resins, for example, acetone, acetonitrile, the N,N-dialkyl formamides and acetamides, ethylene carbonate, cyclohexanone, and the like. Hence, the stabilizers are also ideally suitable for use in minimizing the discoloration of the fiber spinning solutions. In addition, their solubility in many solvents facilitates spinning operations and avoids the necessity of working with two-phase spinning solutions.

It has been found that by varying the specific nature of the radical designated by R in Formulas I and II above, it is possible to select a particular member from the broad range of organic tin succinates which evidences optimum stabilization properties for a given vinyl halide resin. In this manner, it is also possible to select a particular member which evidences maximum solubility when the stabilizer is to be employed in conjunction with fiber spinning solutions.

The organic tin succinates of the invention can readily be prepared by reacting an aliphatic-substituted succinic anhydride (III) or an aliphatic-substituted succinic acid (IV) represented by the general formulas:

(III)

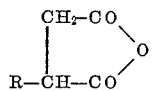

and (IV)

$$\begin{array}{l} CH_2-COOH \\ | \\ R-CH-COOH \end{array}$$

wherein R has the same meaning hereinbefore defined, with a dihydrocarbyltin oxide (V) represented by the general formula:

(V)

wherein $R^1$ and $R^2$ have the same meanings hereinbefore defined, so as to obtain a dihydrocarbyltin aliphatic-substituted succinate of the type represented above by Formula I; or with a trihydrocarbyltin hydroxide (VI) or trihydrocarbyltin oxide (VII) represented by the general formulas:

(VI)

and (VII)

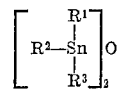

wherein $R^1$, $R^2$ and $R^3$ have the same meanings hereinbefore defined, so as to obtain a bis(trihydrocarbyltin) aliphatic-substituted succinate of the type represented above by Formula II.

The reaction between the aliphatic-substituted succinic anhydride or aliphatic-substituted succinic acid and the hydrocarbyltin compound is best carried out at an elevated temperature such that will facilitate the removal of any water formed during the course of reaction, and preferably at a temperature in the range of between about 60° C. and 120° C. Somewhat higher or lower temperatures may also be employed without disadvantage. Further, it is expedient to incorporate in the reaction mixture an inert diluent which will form an azeotrope with water, so that any water formed during the course of reaction can be removed as such an azeotropic mixture. Typical inert diluents suitable for use in this manner include anhydrous hydrocarbons such as benzene, toluene and heptane, dioxane, ketones such as methyl pentyl ketone, and the like. The reaction can also be performed without the aid of an azeotrope-forming diluent if the reaction temperature is kept above 100° C., or if an inert gas such as nitrogen is bubbled through the reaction mixture, whereby any water formed would be driven off. The reaction is carried out until complete, as indicated, for example, by a cessation in the formation of water of reaction. The organic tin succinate so prepared can then be isolated as a residue material following the removal of any remaining inert diluent by conventional methods such as by evaporation or distillation at elevated temperatures and at atmospheric or reduced pressures.

The preparation of the organic tin succinates of the invention can be illustrated in the following equations showing, by way of example, the preparation of di(2-ethylhexyl)tin propylsuccinate from propylsuccinic anhydride or propylsuccinic acid and di(2-ethylhexyl)tin oxide:

(VIII)
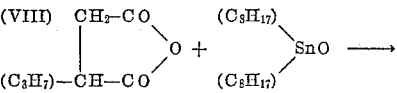

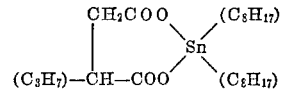

and (IX)
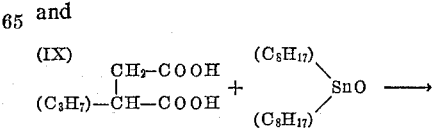

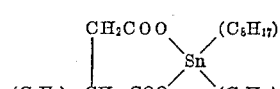

the preparation of bis(triphenyltin) nonenylsuccinate from nonenylsuccinic anhydride or nonenylsuccinic acid and triphenyltin hydroxide:

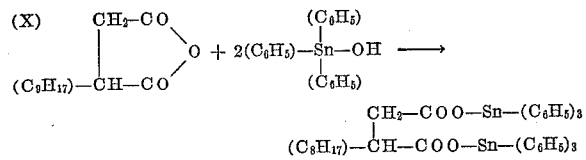

and

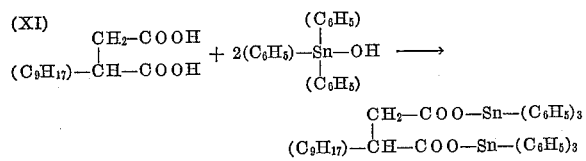

and the preparation of bis(trihexyltin) octylsuccinate from octylsuccinic anhydride or octylsuccinic acid and trihexyltin oxide:

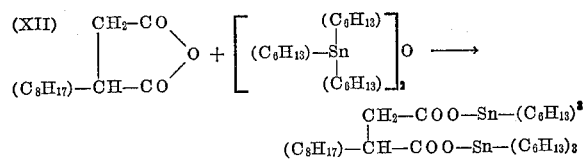

and

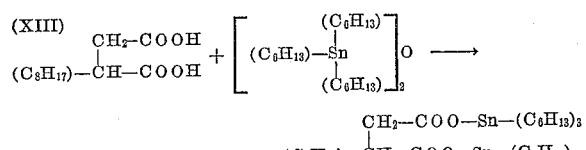

It is to be understood that the radical substituents shown in Equations VIII to XIII can be replaced by any others referred to earlier in connection with Formulas I to VII. In addition it is to be understood that in the case of reaction between a succinic anhydride or succinic acid and a dihydrocarbyltin oxide or trihydrocarbyltin oxide, as represented above by Equations VIII, IX, XII and XIII, the compounds are preferably reacted in equimolar proportions, while the reaction between a succinic anhydride or succinic acid and a trihydrocarbyltin hydroxide, as represented above by Equations X and XI preferably employs 2 moles of the hydroxide per mole of the anhydride or acid. In certain instances, for example, as in reactions such as those represented above by Equations VIII and IX, some polymeric material can also be produced and is recovered together with the organic tin succinate. The amount of polymeric material produced in this manner may vary from about 1 percent up to about 5 percent or more by weight of the product. The presence of such polymer, however, does not adversely affect the stabilizing action of the product. Hence, the product containing the polymer can be utilized in the invention without disadvantage.

The aliphatic-substituted succinic anhydrides or aliphatic-substituted succinic acids reacted with the hydrocarbyltin compounds can be obtained from any convenient source, for example, by reactions such as those disclosed in Flett and Gardner, "Maleic Anhydride Derivatives," John Wiley and Sons, New York, 1952, pages 4 through 9, between maleic anhydride and an unsaturated unconjugated aliphatic or unsaturated unconjugated cycloaliphatic compound. This reaction is generally performed at a temperature between about 180° C. and about 250° C. and desirably in the presence of an inert solvent for the reactants such as benzene, toluene, heptane, and the like. It is also desirable to add a polymerization inhibitor, for instance hydroquinone, to the reaction mixture. The substituted succinic anhydride so obtained contains the unsaturated aliphatic or unsaturated cycloaliphatic compound as a radical substituent, and if desired, can subsequently be converted to the corresponding saturated derivative by conventional hydrogenation techniques, as by reaction with hydrogen under pressure in the presence of a hydrogenation catalyst such as Raney nickel. It is also possible to convert the anhydrides to the corresponding acids by hydrolysis.

It is to be noted that, as hereinabove described, maleic anhydride can be reacted with either a pure olefinic hydrocarbon or with a mixture of olefinic hydrocarbons such as an isomeric mixture of pentenes, hexenes, heptenes, octenes, nonenes, dodecenes, and the like, any of which are commercially available. When reacted with an isomeric mixture of olefinic hydrocarbons, for example, the aliphatic-substituted succinic anhydride or aliphatic-substituted succinic acid, as well as the organic tin succinate subsequently obtained therefrom, will consist of a mixture of compounds, wherein R, defined above with reference to Formulas I to VII, represent an isomeric mixture of the aliphatic or cycloaliphatic radicals. The employment of such an organic tin succinate mixture as a stabilizer for vinyl resins is also contemplated by this invention.

The organic tin succinates of the invention are effective as stabilizers when incorporated in vinyl halide resin compositions in stabilizing concentrations of from about 0.5 percent to about 10 percent based on the weight of the resin. Within this range, an increase in stabilizer concentration generally engenders a higher degree of stability in the resin. Concentrations of from about 2 to about 3 percent by weight of the resin are preferred. While stabilizer concentrations in excess of about 10 percent by weight of the resin can also be employed, attendant disadvantages such as bad odor or alteration of the physical properties of the resin generally prevents the satisfactory utilization of the stabilized resin compositions thereby obtained. On the other hand, when the stabilizer is employed in concentrations of less than about 0.5 percent by weight of the resin, little or no improvement in the stability of the resin may be expected.

The method of incorporating the organic tin succinates in the resin compositions is not critical to the invention. For example, when it is desired to provide stabilized resin solutions such as those in common usage as spinning "dopes" for the production of synthetic fibers, the organic tin succinates which are useful as stabilizers are preferably added to the resin solvent prior to the addition of resin. However, the stabilizers can also be added during or following the dissolution of the resin in the solvent. The solution containing the resin and stabilizer can then be extruded from a spinnerette by conventional means, for example, into a hot air or liquid bath, thus forming stabilized filaments of the resin that incorporate the organic tin succinate as an intimate mixture. The organic tin succinate and the resin can also be milled together, and the homogeneous mixture that results can then be molded, extruded or otherwise formed into stabilized plastic articles such as film, sheet, tubes and the like.

The utility and advantages of the stabilizers of the invention, as well as of the resin compositions stabilized therewith, will further become apparent from the following examples which are included to illustrate the practice of the invention.

EXAMPLE 1

A mixture containing 413 grams of maleic anhydride, 707 grams of 2-methyl-1-pentene, 400 grams of benzene and 25 grams of hydroquinone was reacted in an autoclave at a temperature of 200° C. for a period of 5 hours. After expiration of the reaction period, the crude product was distilled using a 30 by 100 millimeter still column packed with stainless steel sponge. Benzene and excess 2-methyl-1-pentene were removed as a forefraction boiling at a temperature of between 50° C. and 80° C. at atmospheric pressure. The main product fraction containing 2-methyl-1-pentenylsuccinic anhydride, was then distilled over at a temperature of between 140° C. and 150° C. at a pressure of 5 millimeters of mercury. Chemical analysis of this product, weighing 770 grams, indicated the following results.

Calculated for 2-methyl-1-pentenylsuccinic anhydride: C, 65.8%; H, 7.73%. Found: C, 65.7%; H, 7.8%. Anhydride content: 98.0% as 2-methyl-1-pentenylsuccinic anhydride. Acid content: 1.0% as 2-methyl-1-pentenylsuccinic acid.

EXAMPLE 2

Twelve hundred grams of 2-methyl-1-pentenylsuccinic anhydride, prepared as described above in Example 1, was hydrogenated to 2-methylpentylsuccinic anhydride by contact with gaseous hydrogen at a pressure of 1,000 pounds per square inch gauge. The reaction was carried out in an autoclave at a temperature of 125° C. for a period of 6 hours using 2 percent Raney nickel based upon the weight of the anhydride as a hydrogenation catalyst. At the end of the reaction period the pressure was released. The crude product was then filtered to remove the catalyst and distilled in vacuo using a 30 by 100 millimeter still column packed with stainless steel sponge. 2-methylpentylsuccinic anhydride was obtained as a product fraction boiling at a temperature of 145° C. at a pressure of 5 millimeters of mercury. Chemical analysis of this product, weighing 969 grams, indicated the following results.

Calculated for 2-methylpentylsuccinic anhydride: C, 65.2%; H, 8.74%. Found: C, 65.4%; H, 8.9%. Anhydride content: 92.2% as 2-methylpentylsuccinic anhydride. Acid content: 2.1% as 2-methylpentylsuccinic acid.

EXAMPLE 3

A mixture containing 500 grams of maleic anhydride and 1,000 grams of an isomeric mixture of nonenes, the composition of which is indicated below, was heated in an autoclave at a temperature of 180° C. for a period of 30 hours. After expiration of the reaction period, the crude product was distilled to remove the excess nonenes as a forefraction boiling at a temperature of 85° C. at atmospheric pressure and at a temperature of 60° C. at a pressure of 10 millimeters of mercury. The main product fraction, containing an isomeric mixture of nonenylsuccinic anhydrides, distilled over at a temperature of 190° C. at a pressure of 15 millimeters of mercury. Chemical analysis of this product, weighing 802 grams, indicated the following results.

Calculated for nonenylsuccinic anhydride: C, 69.6%; H, 9.1%. Found: C, 69.0%; H, 9.0%. Anhydride content: 95.7% as nonenylsuccinic anhydride. Acid content: 2.1% as nonenylsuccinic acid.

The isomeric mixture of nonenes employed as a reactant in this example represented a commercially available product prepared by the acid-catalyzed trimerization of propylene. Typical infra-red and mass spectrometric analysis of this mixture showed the presence of nonenes containing the following structures:

| Type | Structure | Weight Percent |
|---|---|---|
| Vinyl-type double bond | —CH=CH$_2$ | 3 |
| Symetrical-substituted double bond | —CH=CH— | 13 |
| Side-chained double bond | \C=CH$_2$ / | 9 |
| Tri-substituted double bond | —CH=C\ / | 27 |
| Tetra-substituted double bond | \C=C/ / \ | 48 |

EXAMPLE 4

An isomeric mixture of octenylsuccinic anhydrides was prepared in a manner similar to that described in Example 3 by the reaction of maleic anhydride with an isomeric mixture of octenes produced by the acid-catalyzed dimerization of isobutene. Fifty-two and one-half grams of this isomeric mixture of octenylsuccinic anhydrides (0.25 mole) and 62.2 grams of dibutyl-tin oxide (0.25 mole) were then charged to a glass kettle equipped with a stirrer. The reaction mixture was stirred and slowly heated on a steam bath. A white dough-like mass formed which on continued heating became a grey viscous liquid. Upon completion of the reaction, the residue product was poured into a jar and cooled. An isomeric mixture of dibutyltin octenyl-succinates was thus obtained in an essentially quantitative yield as a grey soft solid having a melting point between 50° C. and 60° C.

EXAMPLE 5

An isomeric mixture of dodecenylsuccinic anhydrides was prepared in a manner similar to that described in Example 3 by the reaction of maleic anhydride with an isomeric mixture of dodecenes produced by the acid-catalyzed trimerization of isobutene. Thirty two and two-tenth grams of this isomeric mixture of dodecenylsuccinic anhydrides (0.12 mole), 29.9 grams of dibutyltin oxide (0.12 mole) and 200 cubic centimeters of benzene were then charged to a round-bottomed glass flask equipped with a stirrer and decanting head. The reaction mixture was stirred and heated to a reflux on a steam bath. Shortly after reflux began, a clear solution resulted. After a reaction period of one hour had expired, benzene was partially stripped off up to a temperature of 95° C. at atmospheric pressure. The clear viscous residue was then poured into a pan and placed in a vacuum oven at a temperature of 100° C. to remove the remaining benzene. The residue product, an isomeric mixture of dibutyltin dodecenylsuccinates, was thus obtained in an essentially quantitative yield as a slightly cloudy, viscous material.

EXAMPLE 6

To a round-bottomed glass flask equipped with a stirrer and a decanting distillation head were charged 448.6 grams of an isomeric mixture of nonenylsuccinic anhydrides (2.0 moles) obtained as described above in Example 3, a solution consisting of 722.2 grams of di(2-ethylhexyl)-tin oxide (2.0 moles) in 1535 of benzene and 200 cubic centimeters of additional benzene. The reaction mixture was stirred and brought to reflux at a temperature of between 83° C. and 85° C. During a 3-hour reflux period, 9 cubic centimeters of water were removed, followed by a partial stripping of benzene. The remaining benzene was completely removed by vacuum stripping at a temperature kept below 90° C. The residue product was then filtered, and an isomeric mixture of di(2-ethylhexyl)tin nonenylsuccinates recovered in essentially quantitative yield as a clear yellow viscous liquid having the following physical properties:

Color _____ 6 Gardner
Refractive index ($N_D^{20}$) _____ 1.4971
Specific gravity (20° C.) _____ 1.110

The product also exhibited solubility in acetone and dimethyl formamide.

EXAMPLE 7

An isomeric mixture of pentenylsuccinic anhydrides was prepared in a manner similar to that described in Example 3 by the reaction of maleic anhydride with an isomeric mixture of pentenes containing 70 percent by weight of 2-methyl-1-butene as the principal component. Five hundred four and six-tenths grams of this isomeric mixture of pentenylsuccinic anhydrides (3.0 moles) and a solution containing 1083.3 grams of di(2-ethylhexyl)tin oxide in 2180 grams of benzene were then charged to a round-bottom glass flask equipped with a stirrer and a decanting distillation head. The reaction mixture was stirred and brought to reflux at a temperature of between 83° C. and 85° C. During a 6-hour reflux period, 7 cubic centimeters of water were removed, followed by 520 cubic centimeters of benzene. The remaining benzene was removed by vacuum stripping at a temperature kept below 90° C. The residue product was filtered, and an isomeric mixture of di(2-ethylhexyl)tin pentenylsuccinates recovered in essentially quantitative yield as a yellow viscous liquid having the following physical properties:

Color _____ 4 Gardner
Refractive index ($N_D^{20}$) _____ 1.4977
Specific gravity (20° C.) _____ 1.155

The product also exhibited solubility in acetone.

EXAMPLE 8

An isomeric mixture of hexenylsuccinic anhydride was prepared in a manner similar to that described in Example 3 by the reaction of maleic anhydride with an isomeric mixture of hexenes. Five hundred forty-six and three-tenths grams of this isomeric mixture of hexenylsuccinic anhydrides (3.0 moles) and a solution containing 1083.3 grams of di(2-ethylhexyl)tin oxide in 2180 grams of benzene were then charged to a round-bottom glass flask equipped with a stirrer and a decanting distillation head. The reaction mixture was stirred and brought to reflux at a temperature of between 85° C. and 89° C. During a 6-hour reflux period, 7 cubic centimeters of water were removed, followed by 385 cubic centimeters of benzene. The remaining benzene was removed by stripping under vacuum, after which the residue product was filtered. An isomeric mixture of di(2-ethylhexyl)tin hexenylsuccinates was thereby recovered in essentially quantitative yield as a yellow viscous liquid having the following physical properties:

Color _____ 4 Gardner
Refractive index ($N_D^{20}$) _____ 1.4988
Specific gravity (20° C.) _____ 1.152

The product also exhibited solubility in acetone.

EXAMPLE 9

To a round-bottomed glass flask equipped with a stirrer and a decanting distillation head were charged 367 grams of triphenyltin hydroxide (1.0 mole), 112.2 grams of an isomeric mixture of nonenylsuccinic anhydrides (0.5 mole) obtained as described above in Example 3 and 1000 cubic centimeters of benzene. The reaction mixture was stirred and brought to reflux at a temperature of between 82° C. and 88° C. During a reflux period of 30 minutes, 8 cubic centimeters of water were removed, followed by a partial stripping of benzene, which was then completely removed under vacuum. An isomeric mixture of bis(triphenyltin) nonenylsuccinates was obtained thereby in essentially quantitative yield as a grey solid which produced hazy solutions when dissolved in acetone, acetonitrile and dimethylformamide.

EXAMPLE 10

A mixture consisting of 210 grams of a copolymer resin of acrylonitrile and vinylidene chloride, 540 grams of acetonitrile and 4.2 grams of an isomeric mixture of di(2-ethylhexyl)tin nonenylsuccinates obtained as described above in Example 6 was slurried at room temperature in a jacketed vessel equipped with a stirrer. The resin employed contained 54 percent by weight of acrylonitrile and 46 percent by weight of vinylidene chloride, and had a molecular weight such that an 0.2 percent solution of the resin in cyclohexanone at a temperature of 29° C. had a specific viscosity of 0.254. The temperature of the slurry was raised to 70° C. with stirring to dissolve the resin and produce a homogeneous solution. The vessel was sealed and the solution then forced through a filtration system and metered to a spinnerette consisting of 60 jets or holes each 0.1 millimeter in diameter. The filaments formed in this manner were extruded at the rate of 25 feet per minute into a coagulating bath consisting of a mixture of water and acetonitrile in a ratio of 95 parts of water to 5 parts of acetonitrile by weight, the bath having a specific gravity of 0.965 at a temperature of 70° C., and which was maintained at a temperature of 70° C. during filament extrusion. The yarn (bundle of filaments) was withdrawn from the coagulating bath at a rate of 28 feet per minute onto a godet system and washed with water at a temperature of 60° C. The yarn was then withdrawn from the godet system at the rate of 84 feet per minute (stretched 200 percent) onto a metal bobbin operating in an oven at a temperature of 68° C.

The stabilized yarn was tested for light stability by measuring the percent reflectance of monochromatic light, having a wavelength of 440 millimicrons, from a knit fabric prepared from the yarn. Readings were taken initially and after 20-hour intervals of exposure to ultraviolet light in an Atlas Fade-Ometer for a total exposure period of 80 hours. The readings, indicating changes in color, were measured using a Colormaster Differential Colormeter, Model 4, manufactured by the Manufacturers Engineering and Equipment Corp., Hatboro, Pa. The results obtained are set forth below in Table A, wherein "reflectance values" represent the percent monochromatic light reflectance of the yarn after exposure in the Atlas Fade-Ometer for the indicated periods of time. High reflectance values, denoting less color in the yarn, are preferred. Also tabulated is the percent drop in light reflectance after 80 hours' exposure, calculated as follows:

$$\frac{\text{Reflectance value (0 hours)} - \text{reflectance value (80 hours)} \times 100}{\text{Reflectance value (0 hours)}}$$

= percent drop in reflectance (after 80 hours)

Also included in the table for comparison are the results obtained from yarn prepared and exposed to light by the same operations, but in which no stabilizer was incorporated.

Table A

| | Reflectance Values | | | | | Percent Drop in Reflectance |
|---|---|---|---|---|---|---|
| | 0 Hrs. | 20 Hrs. | 40 Hrs. | 60 Hrs. | 80 Hrs. | |
| Unstabilized yarn | 64.5 | 39.7 | 33.6 | 30.4 | 27.7 | 57.1 |
| Stabilized yarn | 68.5 | 62.5 | 58.5 | 53.7 | 48.3 | 29.5 |

The effectiveness of the stabilizer is readily apparent from the above table as represented by the drop in reflectance values over the 80-hour period which is a measure of the increased yellowing or darkening of the fibers. The yarn containing the stabilizer shows considerably less discloration with time, i.e., lower precent drop in reflectance values, when exposed to light as compared with yarn containing no stabilizer.

The unstabilized and stabilized yarn was also tested for heat stability by scorching a sample of knit fabric prepared from the yarn at a temperature of 185° C. for 2 minutes and measuring the percent reflectance of filtered "blue light" having a wavelength peak of 435 millimicrons before and after scorching. The readings were measured using a Colormaster Differential Colormeter, Model 4, equipped with a tristimulus "Z" filter. The increase in color after scorching was then calculated in terms of $\Delta K/S$ values, according to the Kubela-Munk relationship, discussed, for example, in "Color in Business, Science and Industry," D. B. Judd, Wiley and Sons, 1952. The ΔK/S values were calculated as follows:

$$\Delta K/S = \frac{(1-R_f)^2}{2R_f} - \frac{(1-R_0)^2}{2R_0}$$

wherein $R_0$ is the initial reflectance of the yarn, i.e., the percent reflectance of "blue light" before scorching, and $R_f$ is the reflectance of the yarn after scorching. The results obtained are set forth below in Table B. In the table, ΔK/S values have been multiplied by a factor of 100 to provide convenient numbers for comparison.

Table B

| | ΔK/S×100 |
|---|---|
| Unstabilized yarn | 16.3 |
| Stabilized yarn | 9.1 |

From the above table it can be seen that the unstabilized yarn showed a greater increase in color after exposure to elevated temperatures than did the yarn stabilized in accordance with the invention.

EXAMPLE 11

A series of experiments was conducted to demonstrate the stabilizing action of various organic tin succinates of the invention. The experiments were carried out as follows. The particular stabilizer to be tested was dissolved in an acetone solution containing 27 percent by weight of a copolymer resin of vinyl chloride and acrylonitrile. The stabilizer was introduced in a concentration of 2 percent by weight based upon the weight of the resin. The resin employed in this series of experiments contained 60.2 percent by weight of vinyl chloride and 39.8 percent by weight of acrylonitrile, and had a molecular weight such that an 0.2 percent solution of the resin in cyclohexanone at a temperature of 29° C. had a specific viscosity of 0.259. From these stabilized solutions, 3-denier yarn was prepared by extrusion, coagulations, stretching and drying procedures, in accordance with conventional fiber spinning techniques. Identical conditions were employed for each resin sample.

Light stability tests were conducted in each case by pressing the stabilized yarn into a flat pad and measuring the reflectance therefrom of light having wavelengths across the range of from 400 to 700 millimicrons. Readings were taken initially and after 20-hour intervals of exposure to ultra-violet light in an Atlas Fade-Ometer for a total exposure period of 80 hours. The readings, indicating changes in color, were measured using a General Electric Recording Spectrophotometer, Catalog No. 5662004. The results obtained are set forth below in Table C, wherein "reflectance values" represent tristimulus Y values expressed as percentages, which constitute an integrated measure of the light reflected across the 400 to 700 millimicron wavelength range after exposure in the Atlas Fade-Ometer for the indicated periods of time. High reflectance values, denoting less color in the yarn, are preferred. Also tabulated for each experiment is the percent drop in light reflectance after 80 hours' exposure, calculated as indicated above in Example 10.

The organic tin succinates employed in the experiments were obtained in accordance with the invention by reacting di(2-ethylhexyl)tin oxide with various alkyl- and alkenylsuccinic anhydrides in a manner similar to that described in Example 6, so as to form di(2-ethylhexyl)tin alkyl- and alkenylsuccinates. In Table C, the particular stabilizer employed in each experiment is indicated by reference to the particular alkyl or alkenyl radical attached to the succinic moiety of the stabilizer molecule, which in turn is determined by the particular alkyl- or alkenyl-succinic anhydride reacted with di(2-ethylhexyl)tin oxide to form the stabilizer.

Table C

| Alkyl or Alkenyl Radical | Reflectance Values | | | | | Percent Drop in Reflectance |
|---|---|---|---|---|---|---|
| | 0 Hrs. | 20 Hrs. | 40 Hrs. | 60 Hrs. | 80 Hrs. | |
| Allyl | 89.0 | 89.7 | 88.4 | 87.8 | 87.1 | 2.1 |
| Propyl | 90.0 | 87.5 | 83.0 | 77.6 | 74.9 | 16.8 |
| Isobutenyl | 82.3 | 78.6 | 76.1 | 73.5 | 71.8 | 12.8 |
| Isomeric pentyl mixture | 90.5 | 91.3 | 88.9 | 87.4 | 85.2 | 5.9 |
| Hexenyl | 87.2 | 85.5 | 83.7 | 82.1 | 81.3 | 6.8 |
| 2-Methyl-1-pentenyl | 92.9 | 92.6 | 91.4 | 91.9 | 89.5 | 3.7 |
| n-Hexyl | 86.1 | 82.1 | 73.0 | 69.0 | 68.4 | 20.6 |
| 2-Ethylbutyl | 89.6 | 88.4 | 85.6 | 83.1 | 80.3 | 10.4 |
| Isomeric heptyl mixture | 89.5 | 89.0 | 81.4 | 81.0 | 79.9 | 10.7 |
| Isomeric dimethyl-hexenyl mixture | 86.9 | 79.1 | 73.1 | 66.7 | 61.2 | 29.6 |
| Isomeric dimethyl-hexyl mixture | 83.2 | 84.6 | 83.8 | 81.6 | 80.9 | 2.8 |
| Isomeric octyl mixture | 90.6 | 90.5 | 87.2 | 85.1 | 83.5 | 7.8 |
| Isomeric nonenyl mixture | 87.7 | 87.5 | 84.9 | 83.1 | 82.0 | 6.5 |
| Isomeric nonyl mixture | 88.5 | 89.5 | 88.2 | 85.7 | 84.9 | 4.1 |
| Isomeric dodecenyl mixture | 82.7 | 79.8 | 75.5 | 72.3 | 70.2 | 15.1 |

In another series of experiments, stabilized yarn, prepared as heretofore described, was knitted into a fabric and tested for light stability by measuring the reflectance therefrom of filtered "blue light" having a wavelength peak of 445 millimicrons after exposure to ultra-violet light in an Atlas Fade-Ometer. Readings were taken initially and after 20-hour intervals of exposure for a total period of 80 hours. The readings were measured using a Photoelectric Reflection Meter, Model 610, manufactured by the Photovolt Corp., New York City, N.Y. The results obtained are tabulated below in Table D in a manner similar to that described above in connection with Table A. Also included in the table for comparison are the results obtained from yarn prepared and exposed to light by the same operations, but in which no stabilizer was incorporated.

Table D

| Alkyl of Alkenyl-Radical | Reflectance Values | | | | | Percent Drop in Reflectance |
|---|---|---|---|---|---|---|
| | 0 Hrs. | 20 Hrs. | 40 Hrs. | 60 Hrs. | 80 Hrs. | |
| Isomeric dodecenyl mixture | 56.5 | 57.5 | 55.0 | 51.0 | 47.0 | 16.8 |
| 2-Methyl-1-pentenyl | 59 | 57.5 | 53.0 | 51.0 | 47.5 | 19.5 |
| Isomeric dimethyl-hexenyl mixture | 59 | 58 | 56 | 52 | 48 | 18.7 |
| Isobutenyl | 58 | 59 | 54.5 | 51 | 49.5 | 14.7 |
| Unstabilized | 37.5 | 33.5 | 24.5 | 16.0 | 15.0 | 60.0 |

From the above tables it can be observed that in addition to providing stabilized yarn which evidences improved initial color, the stabilizers of the invention permit the retention of good color characteristics in the yarn even after prolonged periods of exposure to ultra-violet light. For example, unstabilized yarn shows a much more rapid increase in color upon exposure to ultra-violet light than does stabilized yarn, as evidenced by a higher percent drop in reflectance. Moreover, even after 80 hours of exposure of ultra-violet light, the stabilized yarn evidences less color, i.e., higher reflectance values, than does unstabilized yarn prior to such exposure.

EXAMPLE 12

An experiment to test the light stability of stabilized vinyl halide yarn prepared in accordance with the invention was conducted in a manner similar to that described above in Example 11, modified as indicated below. The copolymer resin employed in this experiment contained 59.6 percent by weight of vinyl chloride and 40.4 percent by weight of acrylonitrile, and had a molecular weight such that an 0.2 percent solution of the resin in cyclohexanone at a temperature of 29° C. had a specific viscosity of 0.261 The stabilizer utilized was bis(triphenyltin) nonenylsuccinate obtained as described above in Example 9. The reflectance values were determined on pads of pressed yarn by measuring the reflectance therefrom of light having wavelengths across the range of from 400 to 700 millimicrons, using a General Electric recording spectrophotometer. The results obtained, including those obtained from a control run in which the stabilizer was not used, are tabulated below in Table E in a manner similar to that described above in connection with Table C.

*Table E*

| | Reflectance Values | | | | | Percent Drop in Reflectance |
|---|---|---|---|---|---|---|
| | 0 Hrs. | 20 Hrs. | 40 Hrs. | 60 Hrs. | 80 Hrs. | |
| Unstabilized fibers | 86.6 | 67.5 | 61.3 | 56.7 | | [1] 34.6 |
| Stabilized fibers | 88 | 88.5 | 86.7 | 85.8 | 85.8 | 2.5 |

[1] After 60 hours exposure to ultra-violet light.

EXAMPLE 13

A series of experiments was conducted as follows. In acetonitrile solutions containing approximately 25 percent by weight of a terpolymer resin of vinyl chloride, vinylidene chloride and acrylonitrile there was dissolved 2 percent by weight (based upon the weight of the resin) of the particular stabilizers to be tested. The resin employed in the experiments designated below in Table F as runs 1 and 2 contained 66.2 percent by weight of acrylonitrile and 21.1 percent by weight of chlorine, and had a molecular weight such that an 0.2 percent solution of the resin in dimethylformamide at a temperature of 29° C. had a specific viscosity of 0.403. The resin employed in the experiments designated as runs 3, 4, 5 and 6 contained 68.4 percent by weight of acrylonitrile and 19.4 percent by weight of chlorine, and had a molecular weight such that an 0.2 percent solution of the resin in dimethylformamide at a temperature of 29° C. had a specific viscosity of 0.319. From these stabilized solutions, 3-denier yarn was prepared by extrusion, coagulation, stretching and drying procedures in accordance with conventional fiber spinning techniques. Identical conditions were employed for each resin sample.

Light stability tests were conducted in each case by measuring the percent reflectance of monochromatic light having a wavelength of 430 millimicrons from a knit fabric prepared from the stabilized yarn. Readings were taken initially and after 20-hour intervals of exposure to ultraviolet light in an Atlas Fade-Ometer for a total exposure period of 80 hours. The readings, indicating changes in color, were measured using a photoelectric reflection meter. The results obtained are set forth below in Table F in a manner similar to that described above in connection with Table A. For comparison, the results obtained from yarn prepared and exposed to light by the same operations, but in which no stabilizer was incorporated, are also included in the table.

The organic tin succinates employed in the experiments were obtained in accordance with the invention by reacting di(2-ethylhexyl)tin oxide with various alkenylsuccinic anhydrides. In the table below, the particular stabilizer employed in each experiment is indicated by reference to the particular alkenyl radical attached to the succinic moiety of the stabilizer molecule, which in turn is determined by the particular alkenylsuccinic anhydride reacted with di(2-ethylhexyl)tin oxide to form the stabilizer.

*Table F*

| Run No. | Alkenyl Radical | Reflectance Values | | | | | Percent Drop in Reflectance |
|---|---|---|---|---|---|---|---|
| | | 0 Hrs. | 20 Hrs. | 40 Hrs. | 60 Hrs. | 80 Hrs. | |
| 1 | Unstablized | 58.6 | 16.1 | 10.9 | 8.3 | 6.7 | 88.5 |
| 2 | Isomeric nonenyl mixture | 67.6 | 57.4 | 53.5 | 47.8 | 43.9 | 35.1 |
| 3 | Isomeric dodecenyl mixture | 60 | 56 | 47 | 35 | 27.5 | 54.3 |
| 4 | 2-Methyl-1-pentenyl | 63.5 | 61 | 49 | 44 | 33 | 48.0 |
| 5 | Isomeric dimethyl-hexenyl mixture | 62.5 | 58 | 55 | 44 | 39 | 37.6 |
| 6 | Isobutenyl | 64 | 57 | 46 | 35 | 28.5 | 55.5 |

The yarn prepared in runs 1 and 2 were also tested for heat stability in a manner similar to that described above in Example 10. The results obtained are set forth below in Table G.

*Table G*

| Run. No.: | $\Delta K/S \times 100$ |
|---|---|
| 1 | 13.0 |
| 2 | 7.4 |

From the above table it can be seen that the unstabilized yarn of run 1 showed a greater increase in color after exposure to elevated temperatures than did the yarn of run 2, stabilized in accordance with the invention.

EXAMPLE 14

An experiment to test the light stability of stabilized vinyl halide yarn prepared in accordance with the invention was conducted in a manner similar to that described above in Example 13, modified as indicated below. The resin employed in this experiment was a terpolymer of vinyl chloride, vinylidene chloride and acrylonitrile, containing 70.0 percent by weight of acrylonitrile and 18.6 percent by weight of chlorine, and having a molecular weight such that the specific viscosity of an 0.2 percent solution of the resin in dimethylformamide at a temperature of 29° C. was 0.394. The stabilizer utilized was bis(triphenyltin) nonenylsuccinate obtained as described above in Example 9. The results obtained, including those obtained from a control run in which the stabilizer was not used, are tabulated below in Table H.

*Table H*

| | Reflectance Values | | | | | Percent Drop in Reflectance |
|---|---|---|---|---|---|---|
| | 0 Hrs. | 20 Hrs. | 40 Hrs. | 60 Hrs. | 80 Hrs. | |
| Unstabilized fibers | 64.9 | 51.8 | 45.5 | 40.8 | 37.6 | 42.1 |
| Stabilized fibers | 64.8 | 60.8 | 57.7 | 54.5 | 51.3 | 20.8 |

EXAMPLE 15

In this series of experiments, the resin employed was a copolymer containing 86.6 percent by weight of vinyl chloride and 13.4 percent by weight of vinyl acetate, having a molecular weight such that a 1.0 percent solution of the resin in methyl isobutyl ketone at a temperature of 20° C. had a specific viscosity of 0.568. Mixtures containing 297 grams of this resin, 1.5 grams of stearic acid as a lubricant and varying proportions of organic tin succinate stabilizers were milled for a total time of 3 minutes on a two-roll mill heated to a temperature of 115° C., and formed into a sheet. The resulting sheets, one-sixteenth of an inch in thickness, was cut into 1 inch squares. The squares were laid on glass plates which were then placed in a circulating air oven maintained at a temperature of 135° C.±0.005° C. Heat stability measurements were carried out as follows. Sample squares were removed at intervals, mounted on cardboard in succession below an unheated square which served as a blank and were rated visually. The effectiveness of the stabilizers was represented by the number of minutes required to produce a marked blackening of the squares. The more stable the resin, the longer was the period of time required to produce blackening.

The results obtained from this series of experiments are tabulated below in Table I. For comparison, results obtained utilizing no stabilizer, and utilizing a commonly employed stabilizer, lead stearate, are also included in the table. In the table, the concentration of stabilizer is indicated as percent by weight of resin; the time required to produce blackening is tabulated in minutes.

*Table I*

| Stabilizer | Concentration of Stabilizer | Time Required to Produce Blackening |
|---|---|---|
| None | | 35 |
| Di(2-ethylhexyl)tin nonenylsuccinate | 0.5 | 160 |
| Di(2-ethylhexyl)tin nonenylsuccinate | 2.0 | 320 |
| Di(2-ethylhexyl)tin nonenylsuccinate | 5.0 | 760 |
| Bis(triphenyltin) nonenylsuccinate | 0.5 | 100 |
| Lead stearate | 1.0 | 90 |

From the above table it can be seen that the vinyl halide resins stabilized in accordance with the invention are more heat stable, i.e., less susceptible to degradation as evidenced by blackening, than similar resins which, however, are either unstabilized or contain a commonly employed stabilizer, viz. lead stearate. For example, a longer exposure period to elevated heat was required to produce blackening in resins stabilized in accordance with the invention, even when compared with a lead stearate stabilized resin containing a two-fold increase in the concentration of stabilizer. Moreover, it is to be observed that by increasing the concentration of stabilizer within the range prescribed by the invention a corresponding increase in stability can generally be achieved in the vinyl halide resins.

EXAMPLE 16

In a manner similar to that described above in Example 15, several other vinyl halide resins, both stabilized and unstabilized, were milled into sheets. In Table J, below, runs 1 and 2 represent experiments in which the resin employed was a copolymer containing 97.7 percent by weight of vinyl chloride and 2.3 percent by weight of vinyl acetate, having a molecular weight such that an 0.2 percent solution of the resin in nitrobenzene at a temperature of 20° C. had a specific viscosity of 0.203. In runs 3, 4 and 5, the resin employed was polyvinyl chloride, having a molecular weight such that an 0.2 percent solution of the resin in nitrobenzene at a temperature of 20° C. had a specific viscosity of 0.182. The milling operations were performed using 210 grams of the resin, 90 grams of dioctyl phthalate as a plasticizer and, when a stabilizer was incorporated, 1.5 grams of the stabilizer. The sheets thereby obtained were cut into 1 inch squares and placed in test tubes having a small hole in the bottom of each tube. The tubes containing the squares were then suspended in a mineral oil bath maintained at a temperature of 135° C.±0.1° C. Heat stability measurements were determined as described above in Example 15 and the results obtained tabulated below in Table J.

*Table J*

| Run No. | Stabilizer | Time Required to Produce Blackening |
|---|---|---|
| 1 | None | 120 |
| 2 | Di(2-ethylhexyl)tin nonenylsuccinate | 700 |
| 3 | None | 90 |
| 4 | Di(2-ethylhexyl)tin nonenylsuccinate | 600 |
| 5 | Bis(triphenyltin) nonenylsuccinate | 200 |

EXAMPLE 17

A series of experiments was conducted in the following manner to determine the heat stability of stabilized vinyl halide resin solutions prepared in accordance with the invention. In each experiment 24 grams of acetone were introduced to a Pyrex bomb and cooled by placing the bomb in an acetone-"Dry Ice" bath until the temperature of the acetone reached approximately −20° C. Six-tenths of a gram of the particular stabilizer utilized in each experiment was then dissolved in the acetone, and to this cooled solution, six grams of a copolymer resin of vinyl chloride and acrylonitrile were added. The resin employed contained 59.6 percent vinyl chloride and 40.4 percent acrylonitrile and had a molecular weight such that an 0.2 percent solution of the resin in cyclohexanone at a temperature of 29° C. had a specific viscosity of 0.261. One experiment was also conducted in which no stabilizer was employed. The bomb was then capped, enclosed in a protective fabric bag and placed in a tumbling water bath at a temperature of 50° C. for about 30 minutes to effect solvation of the resin. Heating was continued for two hours at a temperature of 80° C. whereby a clear resin solution was obtained containing 20 percent solids and suitable for the spinning of synthetic fibers. The color of the resin solution was measured in terms of "Gardner color values" with lower Gardner values, corresponding to less colored solutions, being preferred. The results obtained are set forth below in Table K.

*Table K*

| Stabilizer: | Gardner value |
|---|---|
| None | 8 |
| Dioctyltin 2-methyl-1-pentylsuccinate | 5 |
| Dioctyltin 2-methyl-1-pentenylsuccinate | 5 |

Those resin solutions having higher resistance to discoloration possess lower Gardner values. Hence, from the above table, the improved resistance to discoloration of solutions containing vinyl halide resins and stabilized in accordance with the invention is readily apparent.

What is claimed is:

1. As a new composition of matter, a dihydrocarbyltin aliphatic-substituted succinate represented by the general formula:

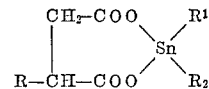

wherein R represents a member selected from the group consisting of unsaturated aliphatic and cycloaliphatic radicals containing from 3 to 18 carbon atoms, and $R^1$ and $R^2$ each represents a hydrocarbyl radical containing from 3 to 14 carbon atoms.

2. As a new composition of matter, a dihydrocarbyltin aliphatic-substituted succinate represented by the general formula:

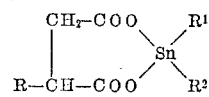

wherein R represents an alkenyl radical containing from 3 to 18 carbon atoms, and $R^1$ and $R^2$ each represents an alkyl radical containing from 3 to 14 carbon atoms.

3. As a new composition of matter, a dihydrocarbyltin aliphatic-substituted succinate represented by the general formula:

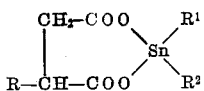

wherein R represents an alkenyl radical containing from 3 to 18 carbon atoms, and R¹ and R² each represents an aryl radical containing up to 14 carbon atoms.

4. As a new composition of matter, a bis(trihydrocarbyltin) aliphatic-substituted succinate represented by the general formula:

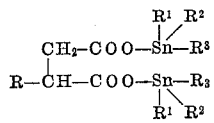

wherein R represents a member selected from the group consisting of unsaturated aliphatic and cycloaliphatic radicals containing from 3 to 18 carbon atoms, and R¹, R² and R³ each represents a hydrocarbyl radical containing from 3 to 14 carbon atoms.

5. As a new composition of matter, an organic tin succinate having the general formula:

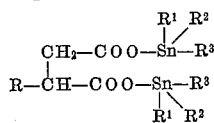

wherein R represents an alkenyl radical containing from 3 to 18 carbon atoms, and R¹, R² and R³ each represents an alkyl radical containing from 3 to 14 carbon atoms.

6. As a new composition of matter, a bis(trihydrocarbyltin) aliphatic-substituted succinate represented by the general formula:

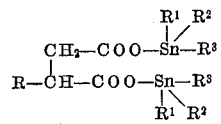

wherein R represents an alkenyl radical containing from 3 to 18 carbon atoms, and R¹, R² and R³ each represents an aryl radical containing up to 14 carbon atoms.

7. As a new composition of matter, dioctyltin hexenylsuccinate, represented by the general formula:

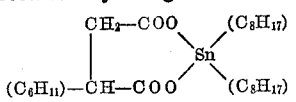

8. As a new composition of matter, dioctyltin octenylsuccinate, represented by the general formula:

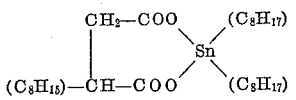

9. As a new composition of matter, dioctyltin nonenylsuccinate, represented by the general formula:

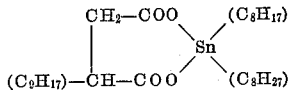

10. As a new composition of matter, dioctyltin dodecenylsuccinate, represented by the general formula:

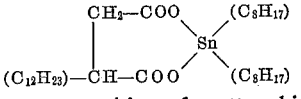

11. As a new composition of matter, bis(triphenyltin) nonenylsuccinate, represented by the general formula:

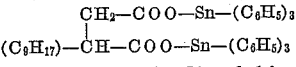

References Cited in the file of this patent

UNITED STATES PATENTS

| | | |
|---|---|---|
| 2,307,092 | Yngve | Jan. 5, 1943 |
| 2,307,157 | Quattlebaum et al. | Jan. 5, 1943 |
| 2,560,034 | Eberly | July 10, 1951 |
| 2,692,204 | Nowak | Oct. 19, 1954 |
| 2,727,917 | Mack et al. | Dec. 20, 1955 |
| 2,762,821 | Walde et al. | Sept. 11, 1956 |
| 2,801,258 | Johnson | July 30, 1957 |
| 2,838,554 | Gloskey | June 10, 1958 |
| 2,910,452 | Crauland | Oct. 27, 1959 |

FOREIGN PATENTS

| | | |
|---|---|---|
| 539,325 | Belgium | Dec. 27, 1955 |
| 773,434 | Great Britain | Apr. 24, 1957 |